United States Patent [19]

White

[11] 4,209,785
[45] Jun. 24, 1980

[54] CORRELATION ARRANGEMENTS

[75] Inventor: Eric L. C. White, Iver, England

[73] Assignee: E M I Limited, Hayes, England

[21] Appl. No.: 16,497

[22] Filed: Mar. 1, 1979

[30] Foreign Application Priority Data

Mar. 3, 1978 [GB] United Kingdom ............. 8485/78

[51] Int. Cl.² .................................................. G01S 9/02
[52] U.S. Cl. ................................................... 343/7 PF
[58] Field of Search ....................................... 343/7 PF

[56] References Cited

U.S. PATENT DOCUMENTS

| | | | |
|---|---|---|---|
| 3,332,077 | 7/1967 | Nard et al. | 343/7 PF |
| 3,408,938 | 11/1968 | Pagazani et al. | 343/7 PF X |
| 3,821,737 | 6/1974 | Kalmus | 343/7 PF |
| 3,872,792 | 3/1975 | Goldberg et al. | 343/7 PF X |
| 3,913,103 | 10/1975 | Cash | 343/7 PF |
| 4,072,944 | 2/1978 | Bianco et al. | 343/7 PF |

OTHER PUBLICATIONS

"Radar Design Principles", by Fred E. Nathanson, published by McGraw-Hill Book Company, pp. 457-462.

Primary Examiner—Malcolm F. Hubler
Attorney, Agent, or Firm—Fleit & Jacobson

[57] ABSTRACT

A correlator arrangement for a radar fuze (FIG. 1) in which the outgoing signal is modulated with a reference code and the incoming echo correlated with the code to pick out the signal. To reduce the effect of Doppler frequency modulation there are means 15-18 to reduce the frequency of signals outside a predetermined frequency range to bring them within that range.

6 Claims, 3 Drawing Figures

CORRELATION ARRANGEMENTS

The present invention generally relates to arrangements for correlating a coded signal with a received signal which may be similarly coded. In particular it relates to a radar fuze device including such an arrangement.

In certain systems, such as known radar fuzes, a transmitted radar signal is modulated with a code-word, usually generated as a pseudo-random code for unpredictability. A received signal, which is expected to result from reflection of the transmitted signal at a target, is then correlated with the code word. A good correlation is taken to indicate that the received signal is the wanted reflection. Conversely a poor correlation is taken to indicate that the received signal is not the wanted reflection and may be a jamming signal.

It is, of course, possible for a jamming source to imitate the coded signal and in the case of a radar fuze such an attempt may be made to cause premature detonation of the fuzed warhead. To reduce the risk of this, it is desirable for the code word duration T to be as long as possible. For a sufficiently long duration T a jamming source can only generate the code word if the range cT (where c is the velocity of light) is sufficient that the jamming power is not enough to trigger the fuze.

Doppler considerations must, however, also be taken into account. In a typical system the correlator comprises a multiplier, (in which the homodyned received signal and the reference code signal are multiplied) and a summator, such as a leaky integrator or low pass filter, must be effective over at least time T if the correlation is to reject uncorrelated signals properly. As a result of Doppler there is a phase change over the duration of the word of $2\pi T f_D$ (where $f_D$ is the Doppler frequency), which significantly and adversely affects the correlation if $T_D f_D$ is greater than a fraction of a cycle, typically $\frac{1}{4}$. Clearly this indicates that shorter code words should be used, contradicting the considerations mentioned earlier.

It is an object of this invention to provide an arrangement allowing the use of longer code words despite the Doppler considerations mentioned.

According to the invention there is provided a radar fuze device including:

a transmitter for transmitting a signal which is binary phase modulated according to a reference code;

a receiver for receiving the transmitted signal reflected from a target to produce a demodulated signal representing the reference code;

a multiplier for receiving the demodulated signal and a signal representing the reference code to produce a signal representing the product of the code with itself delayed by an amount dependent on the range of the target from the fuze device; and an integrator for integrating the product signal over the duration T of the reference code to produce a signal representing the autocorrelation function of the reference code; and wherein, in order to reduce the effect, on the autocorrelation, of a Doppler frequency shift of the received signal, which shift would otherwise introduce a Doppler frequency component into the signal integrated by the integrator, the device further includes, prior to the integrator, means for causing mixing of a further frequency component with the Doppler frequency component so that the signal integrated by the integrating means has a component, derived from the Doppler frequency component, of frequency f, where fT is less than $\frac{1}{4}$.

The invention reduces the frequency of the doppler frequency component of the signal from the correlator multiplier and to reduce the signals up to 80 kHz effectively to 16 kHz, which is a suitable upper limit, it is desirable to use several parallel channels of frequency shifting and integration. An output can be taken from any of these channels so that in a radar fuze the fuze can be triggered if any channel exceeds a preset threshold.

The frequency shifting can take place between a single multiplier and a plurality of integrators or between the reference signal and a plurality of multipliers, each of which is followed by a respective integrator.

In order that the invention may be clearly understood and readily carried into effect it will now be described by way of example with reference to the accompanying drawings which show arrangements, in block diagrammatic form, of radar fuzes.

The radar fuze will, in practice be used in a situation in which there is relative movement between the radar and a target, and so a Doppler frequency $f_D$ will exist. The Doppler frequency may be anywhere between 0 and $f_M = f_{D\ max}$, where in a practical embodiment using X-band radar the relative velocity between radar and target may be Mach 4 so that $f_M = 80$ kHz.

Figure 1:
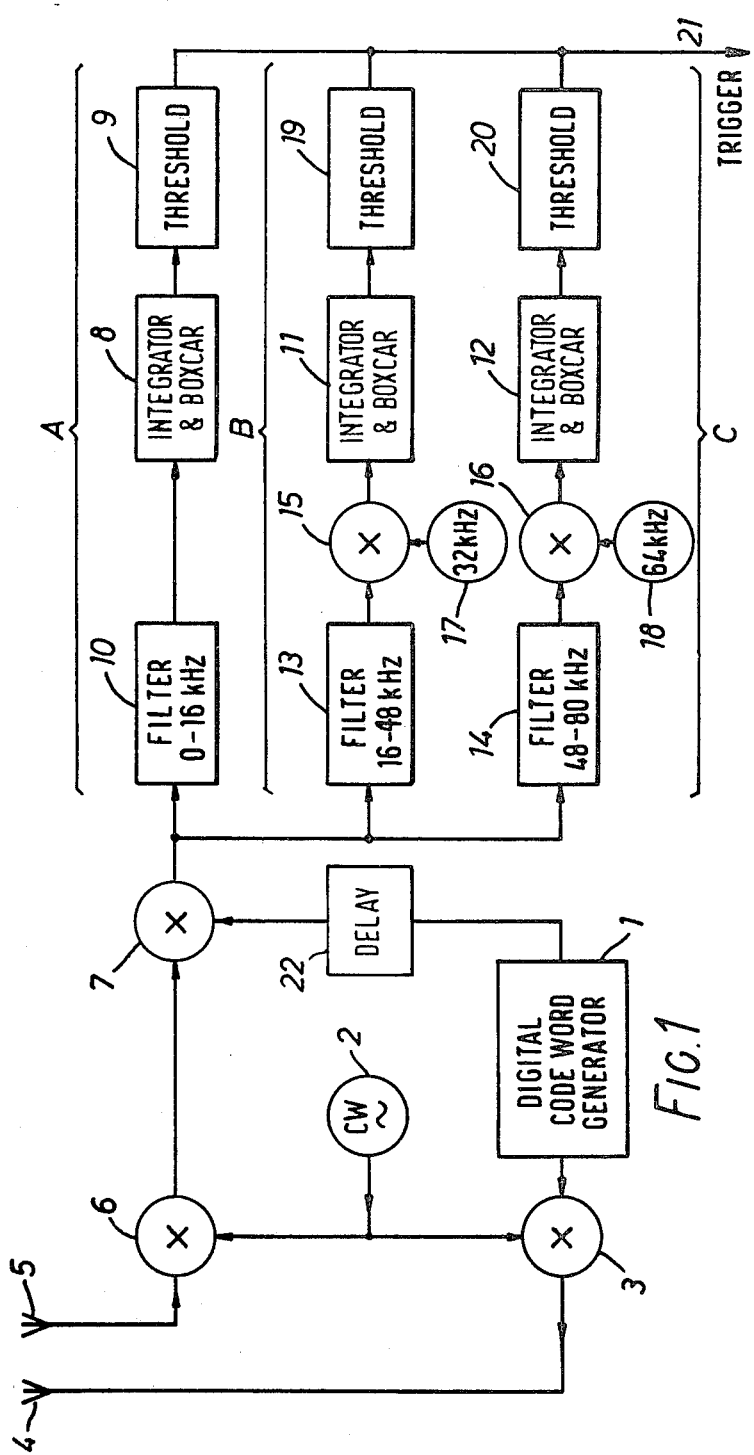
FIG. 1 shows, in block diagrammatic form, an arrangement of the novel radar fuze.

Referring to FIG. 1 a digital recurrent code-word generator 1 generates binary pseudo-random code words of predetermined length in any known manner. A continuous wave source 2 generates a radar frequency signal and this is phase modulated with the code word in a multiplier 3, such that the phase changes 180° when the digits in the word change from 0 to 1 or vice versa. This may be achieved by providing the code word as a sequence of −1's and +1's. The modulated signal is radiated from a suitable aerial indicated generally at 4. Indicated generally at 5 is a receiving aerial, which may be the transmitting aerial, at which incoming echo signals, including the reflected modulated transmissions and a Doppler frequency component, are received. These echo signals are homodyne detected in known manner in a multiplier 6 to provide an output which should be the digital code word, which originated at 1, delayed by the time of travel to the target and back and affected by the Doppler frequency. The code word from 1, delayed by a predetermined delay in a device 22 for use as a reference signal, and the output from 6 are multiplied in a correlation multiplier 7, which operates in the same manner as multiplier 3, to provide an output signal. The delay device 22 sets the desired range at which the fuze is triggered.

Assume there is no Doppler frequency component; in that case there is no need for the circuit components 10 to 20 and so for the present it is assumed they do not exist. The output of the multiplier 7 is the product of the reference signal and the echo signal. This product is applied to an integrator 8 which ideally has its output reset to zero at the end of each code-word, and has its output value noted and held, in so-called "box-car" operation, immediately before it is reset. The product is integrated over the duration of the code word to produce the autocorrelation function of the reference signal delayed by the predetermined time set by delay device 22 with itself delayed by a time delay proportional to the range of the radar from the target. The value of the autocorrelation function is representative of the range. When the range is proportional to the predetermined time, the autocorrelation function has a maximum value. The value of the function is applied to a threshold detector 9, which senses the maximum value to trigger the fuze.

In the presence of Doppler frequency, the output of the multiplier 7 is the Doppler frequency modulated by the product. The presence of the Doppler frequency adversely affects the correlation of the code word with itself. In effect it applies to the word a phase shift which varies along the word. The maximum phase shift is $Tf_D$ where T is the duration of the word and $f_D$ the Doppler frequency. It has been found that if $Tf_D$ is greater than $\frac{1}{4}$ cycle, the value of the autocorrelation function is significantly reduced (see Radar Design Principles—Nathanson—Chapter 12.) It may be stated that for times of travel of zero or integral t multiples of the code-word duration T, in the absence of Doppler ($f_D=0$), the output of integrator 8 is the received signal amplitude. For $Tf_D<<1$, the output is at $f_D$ with the same amplitude. The signal is fed to a threshold device 9 and at some time in a Doppler cycle triggers that device as it would have done for $f_D=0$. As $Tf_D$ increases the value of the autocorrelation function reduces, a useful limit to $Tf_D$ being about $\frac{1}{4}$ cycle for a loss in value of 1 dB.

There thus arises the conflict of needing a long word to make jamming more difficult, but needing a short word to reduce the adverse affects of the Doppler frequency. It will be seen that the greater the Doppler frequency $f_D$ the greater the phase shift.

In accordance with the present invention, the Doppler frequency component is reduced in frequency to a predetermined range. In the present example where the maximum Doppler frequency is 80 kHz, that frequency is reduced to a maximum of 16 kHz.

Because the radar fuze is a linear system prior to the integration, the frequency reduction may take place at any suitable location prior to the integration. In practice, only the range of the Doppler frequency will be known and so several parallel channels, having different frequency shifts are used. In the example shown in the drawing, three channels A, B and C are used. These channels A, B and C each comprise a filter 10, 13, 14 for selecting a frequency band, an integrator 8, 11, 12 for producing the autocorrelation function, and a threshold detector 9, 19, 20. Channels B and C comprise frequency sources 17 and 18 and mixers 15 and 16.

The filter of channel A selects signals from the multiplier having a Doppler frequency in the range 0–16 kHz. Such signals have an acceptable Doppler frequency and are not reduced in frequency. The filter 13 in channel B selects signals having a Doppler frequency in the range 16–48 kHz, and the filter 14 in channel C selects signals having such a frequency in the range 48–80 kHz. Such signals have unacceptable frequencies which are thus reduced at the mixers 15 and 16 to the range 0–16 kHz.

Thus for any value of $f_D$ up to $f_M$ there will be either a direct signal from 7 or a beat frequency from 15 or 16 at a frequency $\not> 0.2f_M$, to one of integrators 8, 11 or 12 to produce an output from a threshold 9, 19 or 20 and to a common trigger at 21.

The additional circuits 11–20 have the effect of giving substantially equal performance, other things being equal, with a code-word length and integration five times greater than without them. In practice a ratio of four may be used because maximum code lengths are normally of the form $2^N-1$.

Figure 2:
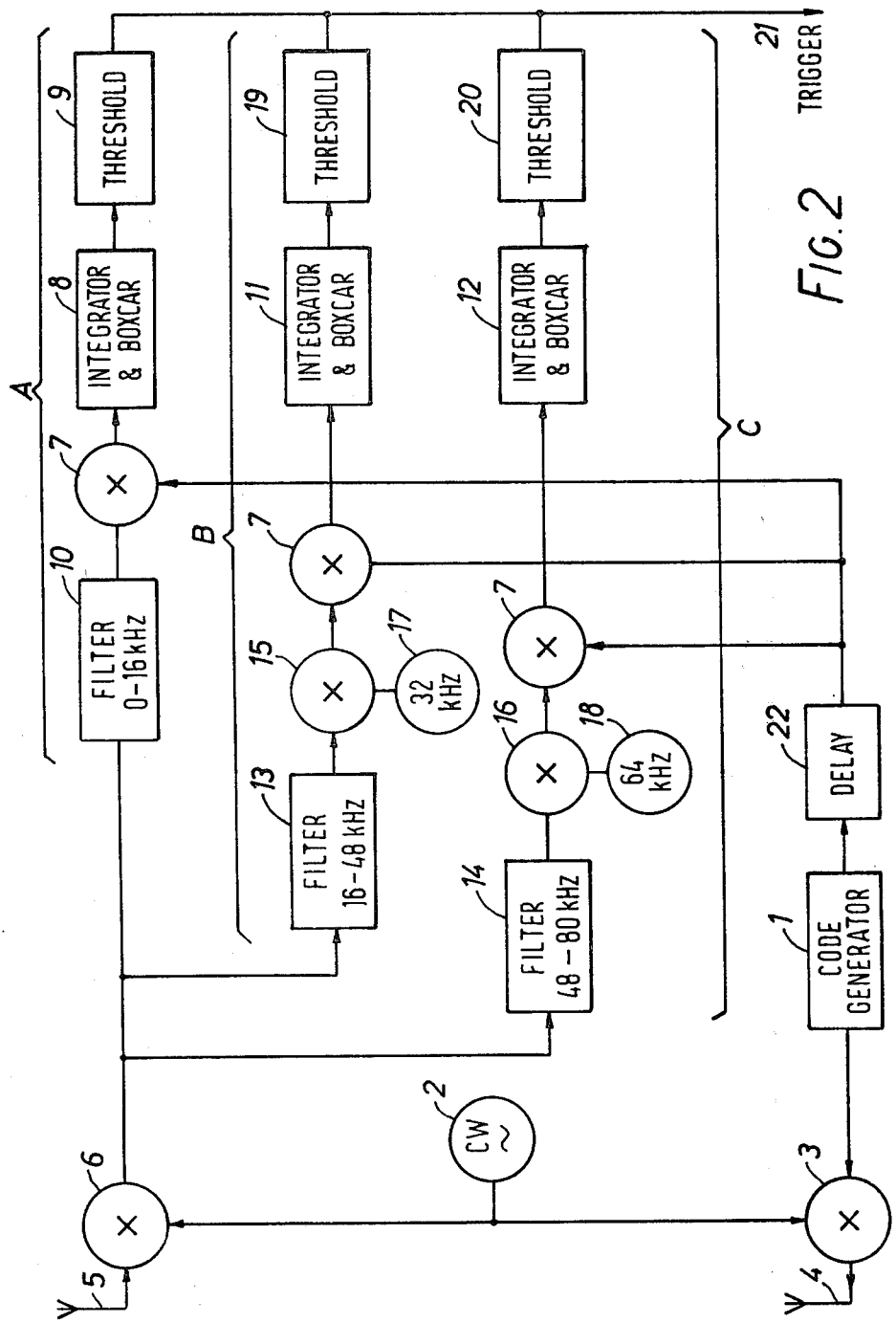
FIG. 2 shows, in block diagrammatic form, another arrangement of the novel radar fuze.
Figure 3:
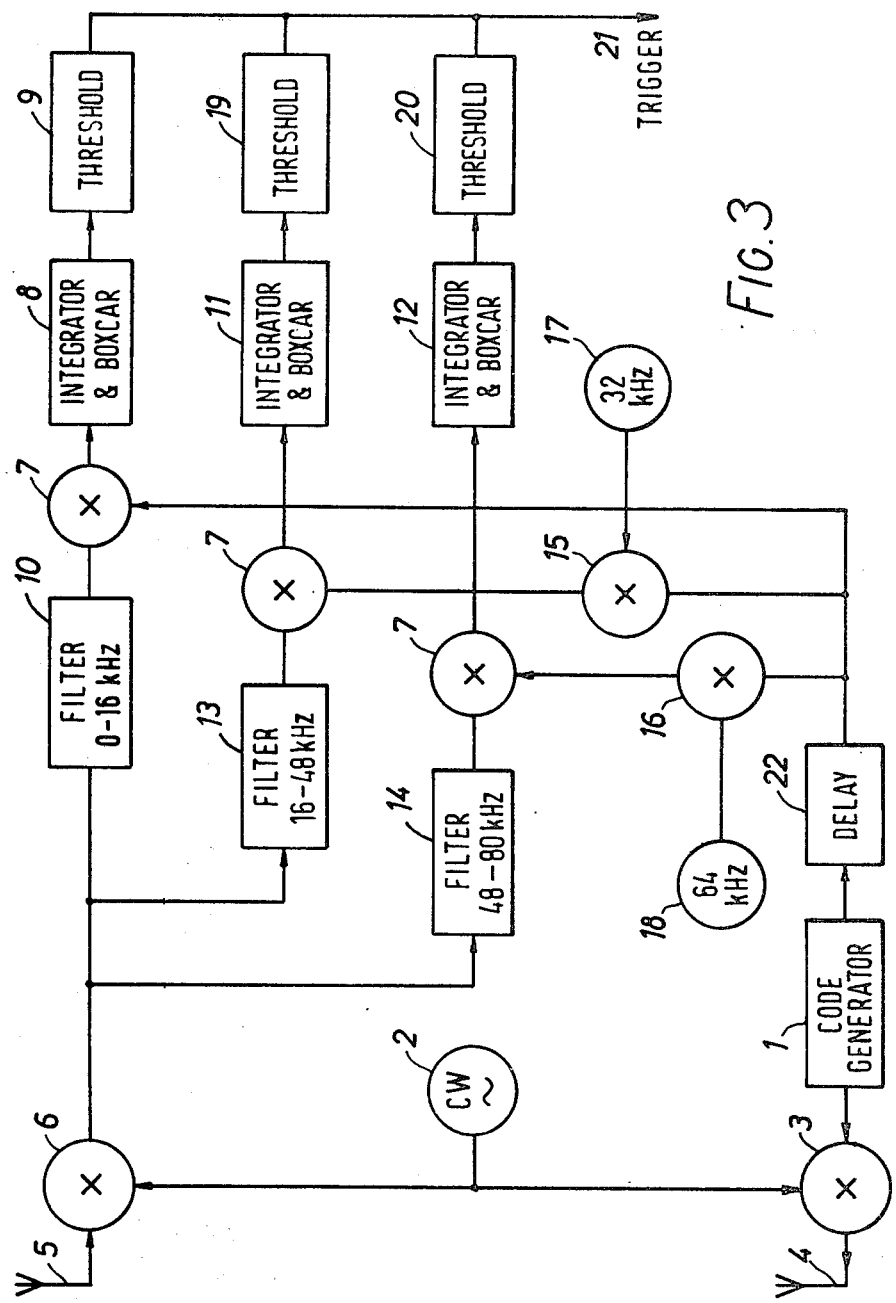
FIG. 3 shows, in block diagrammatic form, a skill further arrangement of the novel radar fuze.

Variations of the invention will be apparent to those skilled in the art. As mentioned hereinbefore, the frequency reduction may take place at any suitable location prior to the integration. Thus instead of the arrangement shown in FIG. 1 there may be three channels A, B, C as shown in FIG. 2 commonly connected to the detector multiplier 6, and comprising respective filters 10, 13, 14 for selecting the respective frequency bands, two comprising mixers 15 and 16 and frequency sources 17, 18 for frequency reduction, and each comprising a correlation multiplier 7 and an integrator 8, 11, 12 and a threshold detector 9, 19, 20. P In another possible arrangement as shown in FIG. 3 the frequency reduction may take place by providing a plurality of channels commonly connected to the code word generator 1 and delay device 22. Two of the channels include a mixer 16, 15 for applying a frequency component from a source 18, 17 to the word, and each channel includes a multiplier 7 for multiplying the word plus frequency component with the signal from the multiplier 6, and an integrator 8, 11, 12 and a threshold detector 9, 19, 20. It will also be appreciated that filters (e.g. 10, 13 and 14) may be omitted if desired without substantial effect on the principle of the invention.

What I claim is:

1. A radar fuze device including:
   a transmitter for transmitting a signal which is binary phase modulated according to a reference code;
   a receiver for receiving the transmitted signal reflected from a target to produce a demodulated signal representing the reference code;
   a multiplier for receiving the demodulated signal and a signal representing the reference code to produce a signal representing the product of the code with itself delayed by an amount dependent on the range of the target from the fuze device; and
   an integrator for integrating the product signal over the duration T of the reference code to produce a signal representing the autocorrelation function of the reference code; and
   wherein, in order to reduce the effect, on the autocorrelation, of a Doppler frequency shift of the received signal, which shift would otherwise introduce a Doppler frequency component into the signal integrated by the integrator, the device further includes, prior to the integrator,
   means for causing mixing of a further frequency component with the Doppler frequency component so that the signal integrated by the integrating means has a component, derived from the Doppler frequency component, of frequency f, where fT is less than $\frac{1}{4}$.

2. A device according to claim 1, wherein the means for causing mixing comprise a source of the further component and a mixer having inputs connected to the source and to the multiplier, and an output connected to the integrator.

3. A radar fuze device including
   a transmitter for transmitting a signal which is binary phase modulated according to a reference code;

a receiver for receiving the transmitted signal reflected from a target to produce a demodulated signal representing the reference code; and a multiplier for receiving the demodulated signal and a signal representing the reference code to produce a signal representing the product of the code with itself delayed by an amount dependent on the range of the target from the fuze device, and wherein a plurality of signal paths are commonly connected to the multiplier, each path including an integrator for integrating over a time T substantially equal to the duration of the reference code to produce a signal representing the autocorrelation function of the reference code, and in order to reduce the effect, on the autocorrelation, of a Doppler frequency shift of the received signal, which shift would otherwise introduce a Doppler frequency component into the signala integrated by the integrator, means, provided in the path prior to the integrator, for causing mixing of a further frequency component with the Doppler frequency component so that the signal integrated by the integrating means has a component, derived from the Doppler frequency component of frequency f, where fT is less than $\frac{1}{4}$.

4. An arrangement according to claim 3, wherein each path includes filter means provided in the path prior to the mixing means, for selecting a respective predetermined frequency range.

5. An arrangement according to claim 3 or 4, comprising a further signal path, connected in parallel to the said paths to the combining means, the further path comprising an integrator for integrating over the time T.

6. An arrangement according to claim 5, wherein the further path also comprises a filter means for selecting a predetermined frequency range.

* * * * *